US008170026B2

(12) United States Patent
Aggarwal et al.

(10) Patent No.: US 8,170,026 B2
(45) Date of Patent: *May 1, 2012

(54) METHOD AND APPARATUS FOR VIRTUAL CIRCUIT ROUTES

(75) Inventors: Rahul Aggarwal, San Francisco, CA (US); Ajay M. Patel, San Ramon, CA (US)

(73) Assignee: Ericsson AB, Stockholm (SE)

( * ) Notice: Subject to any disclaimer, the term of this patent is extended or adjusted under 35 U.S.C. 154(b) by 224 days.

This patent is subject to a terminal disclaimer.

(21) Appl. No.: 12/368,003

(22) Filed: Feb. 9, 2009

(65) Prior Publication Data

US 2009/0141724 A1 Jun. 4, 2009

Related U.S. Application Data

(63) Continuation of application No. 10/461,854, filed on Jun. 13, 2003, now Pat. No. 7,489,681.

(51) Int. Cl.
*H04L 12/28* (2006.01)
*H04J 3/16* (2006.01)
(52) U.S. Cl. .............. 370/392; 370/395.3; 370/469
(58) Field of Classification Search .................. None
See application file for complete search history.

(56) References Cited

U.S. PATENT DOCUMENTS

| 6,069,895 | A |   | 5/2000 | Ayandeh |   |
|---|---|---|---|---|---|
| 6,167,025 | A | * | 12/2000 | Hsing et al. | 370/216 |
| 6,188,689 | B1 | * | 2/2001 | Katsube et al. | 370/389 |
| 6,373,845 | B1 | * | 4/2002 | Aramaki et al. | 370/395.3 |
| 6,389,023 | B1 |   | 5/2002 | Matsuzawa et al. |   |
| 6,888,838 | B1 | * | 5/2005 | Ji et al. | 370/401 |
| 7,035,256 | B1 |   | 4/2006 | Neufeld et al. |   |
| 7,142,545 | B1 | * | 11/2006 | Alsup et al. | 370/395.3 |
| 7,221,675 | B2 | * | 5/2007 | Bryden et al. | 370/392 |
| 7,283,465 | B2 |   | 10/2007 | Zelig et al. |   |

OTHER PUBLICATIONS

Snyder, Beth. "New IP switch scheme joins the fold." Telephony Online, May 26, 1997.
"Ipsilon Enhances IP Switch ATM1600 Ethernet Backbone Switch." Computer Business Review Online, Sep. 10, 1996, Issue 2995.
"Ipsilon Networks First to Fully Implement FireWall-1 from Check Point Software for High-Speed Networking." http://www.checkpoint.com/press/partners/1997/ipsilon9704.html, Apr. 14, 1997.
"TCP/IP abc's." TechEncyclopedia. http://www.techweb.com/encyclopedia/defineterm?term=TCP%2FIPabc%27s, Jul. 7, 2003.
"Cisco 12000 Series Gigabit Switch Routers." http://www.cisco.com/univercd/cc/td/doc/product/software/ios112p/gsr/c12012.htm, Oct. 23, 2006.
"IP on Everything." TechEncyclopedia. http://www.techweb.com/encyclopedia/defineterm?term=IPonEverything, Jul. 7, 2003.

(Continued)

*Primary Examiner* — Melanie Jagannathan
(74) *Attorney, Agent, or Firm* — Blakely Sokoloff Taylor & Zafman, LLP

(57) ABSTRACT

A method and apparatus for virtual circuit routes is described. A method in a network element comprises associating a virtual circuit to a layer 3 next hop, the virtual circuit being associated with a layer 2 protocol specific logical circuit, receiving a packet on the logical circuit, processing the packet with configuration information indicated by the virtual circuit, and forwarding the packet to the layer 3 next hop associated with the virtual circuit without processing the packet's layer 3 header.

22 Claims, 14 Drawing Sheets

OTHER PUBLICATIONS

Freedman, Alan. "Computer Desktop Encyclopedia, Ninth Edition." pp. 214-215, 539-540, 643 and 715-716. Osborne/McGraw Hill, Berkeley, California, 2001.

"SmartEdge OS Configuration Guide—Release 2.1, Part No. 220-0310-01." Redback Networks Manual, copyright 1998-2002, Redback Networks, Inc.

* cited by examiner

| ROUTING TABLE 100 | | | | | |
|---|---|---|---|---|---|
| DESTINATION | NEXT HOP | INTERFACE | ... | Flags or | METRIC TAG |
| A | X | 1 | ... | ... | ... |
| B | X | 1 | ... | ... | ... |
| C | X | 1 | ... | ... | ... |
| ... | ... | ... | ... | ... | ... |
| M | Z | 3 | ... | ... | ... |
| N | Z | 3 | ... | ... | ... |

FIG. 1 (PRIOR ART)

FORWARDING TABLE 200

| DESTINATION | NEXT HOP | INTERFACE |
|---|---|---|
| A | X | 1 |
| B | X | 1 |
| C | X | 1 |
| ... | ... | ... |
| M | Z | 3 |
| N | Z | 3 |

FIG. 2 (PRIOR ART)

CONTROL PLANE RIB VIRTUAL CIRCUIT STRUCTURE
401

ELEMENT OF VIRTUAL CIRCUIT TABLE
901

| VIRTUAL CIRCUIT ID<br>903 | TIMERS<br>929 |
|---|---|
| POINTER TO INTERFACE<br>905 | FIB NEXT HOP POINTER<br>931 |
| POINTER TO PORT<br>909 | |
| FLOW COUNTERS (BYTE AND/OR PACKET)<br>911 | |
| POINTER TO ROOT MODULAR FUNCTIONAL BLOCK<br>913 | |
| POINTER TO FIB<br>915 | |
| POINTER TO ACL<br>917 | |
| POINTER TO AN LFIB<br>919 | |
| ERROR COUNTERS (UNREACHABLE, VIRTUAL CIRCUIT DOWN, UNKNOWN ENCAPSULATION)<br>921 | |
| REFERENCE COUNTER<br>923 | |
| ENCAPSULATION TYPE<br>925 | |
| TRANSMIT COUNTER<br>927 | |

FIG. 9

METHOD AND APPARATUS FOR VIRTUAL CIRCUIT ROUTES

CROSS-REFERENCE TO RELATED APPLICATIONS

This application is a continuation of application Ser. No. 10/461,854, filed Jun. 13, 2003, which is hereby incorporated by reference.

BACKGROUND OF THE INVENTION

1. Field of the Invention

The invention relates to the field of communication. More specifically, the invention relates to communication networks.

2. Background of the Invention

A router hosts a routing protocol(s) that can include one or more of the following: the Routing Information Protocol (RIP), the Interior Gateway Protocol (IGP), the Border Gateway Protocol (BGP), the Exterior Gateway Protocol (EGP), Open Short Path First (OSPF), Intermediate System to Intermediate System (IS-IS), etc. A router exchanges messages with neighboring routers in accordance with one or more of the hosted routing protocols. These messages are used to maintain a table of routing information ("routing table"). A routing table stores the state of the network topology and the best-known route to destinations. A given routing table can include route information for hundreds of thousands of routes. Route information typically includes a destination network prefix, an Internet Protocol (IP) address for a next hop, an outgoing physical interface or port number, metrics of the route, etc.

FIG. 1 (Prior Art) is a diagram illustrating a routing table. The routing table is comprised of multiple columns. The routing table 100 illustrated in FIG. 1 identifies destinations in the first column of the routing table 100. In the second column of the routing table 100, addresses for next hops corresponding to the destinations in the first column are identified. In the third column of the routing table 100, interfaces corresponding to the next hops in the second column are identified. A given row of the routing table 100 describes a path to the destination identified in the first column of the given row.

In the routing table 100 illustrated in FIG. 1, rows 1-3 of the routing table 100 identify destinations A, B, and C. The next hop in the paths to the destinations A-C is a network element X as indicated in the routing table 100. The interface for the next hop X is the interface 1 as indicated in the third column of rows 1-3 of the routing table 100. The last two rows of the routing table 100 identify a next hop Z for destinations M and N. The last two rows identify an interface 3 as the interface corresponding to the next hop Z.

At startup, a given router, which hosts the routing table 100, downloads the routing table 100 into each of the router's line cards. The given router may download the entire routing table 100, or selected columns from the routing table 100. A single route to each destination in the routing table 100 is downloaded into each line card. Typically, a router downloads the next hop and interface for each destination in the routing table 100 for each of its line cards as a forwarding table.

FIG. 2 (Prior Art) is a forwarding table. Line cards host forwarding tables in order to remove from the central processing unit the intensive task of processing traffic. When a given one of a router's line cards receives traffic, the line card processes the traffic to determine the traffic's destination and forwards the traffic to the corresponding next hop via the outgoing physical interface indicated by the line card's forwarding table. For example, a line card that receives traffic destined for the network element A, processes the packet at each layer (i.e. each header) until reaching the layer 3 header to determine the packet's layer 3 destination. After determining the packet's layer 3 destination, the layer 3 destination is looked up in the forwarding table. From the forwarding table, the process determines how to forward the packet in order to transmit the packet to its destination.

BRIEF SUMMARY OF THE INVENTION

A method and apparatus for virtual circuit routes is described. According to one aspect of the invention, a method in a network element provides for associating a virtual circuit to a layer 3 next hop. The virtual circuit is associated with a layer 2 protocol specific logical circuit. The method further provides for receiving a packet on the logical circuit, processing the packet with configuration information indicated by the virtual circuit, and forwarding the packet to the layer 3 next hop associated with the virtual circuit without processing the packet's layer 3 header.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 1 (PRIOR ART) is a diagram illustrating a routing table.

FIG. 2 (Prior Art) is a forwarding table.

FIG. 9 is an exemplary diagram illustrating an element of a virtual circuit table according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention. In the following description, the terms routing information base (RIB) and forwarding information base (FIB) are respectively used to refer to what are typically called a routing table and a forwarding table. Various data structures and techniques can be utilized to implement a routing and/or forwarding information base (e.g., trees, tries, hash tables, hash tables that index a tree, etc.).

In addition, the term route is typically used to describe a destination, next hop, and optionally an interface. The term layer 3 route is used in reference to a destination identified by a layer 3 address/prefix and its corresponding next hop. The term virtual circuit route is used with reference to a virtual circuit and its corresponding next hop.

Furthermore, the terms logical circuit and virtual circuit are used in the detailed description to distinguish a layer 2 entity that is internal to a network element and a layer 2 protocol specific entity. One example of a logical circuit is a VPI VCI pair for ATM. In contrast, a virtual circuit is a layer 2 entity associated with a logical circuit, a port, and a slot. A network element may have various logical circuits configured according to different protocols (e.g., ATM, Frame Relay, etc.) while virtual circuits are generic throughout the network element. In other words, virtual circuits can be configured for any of the various logical circuits configured on the hosting network element.

Figure 3:
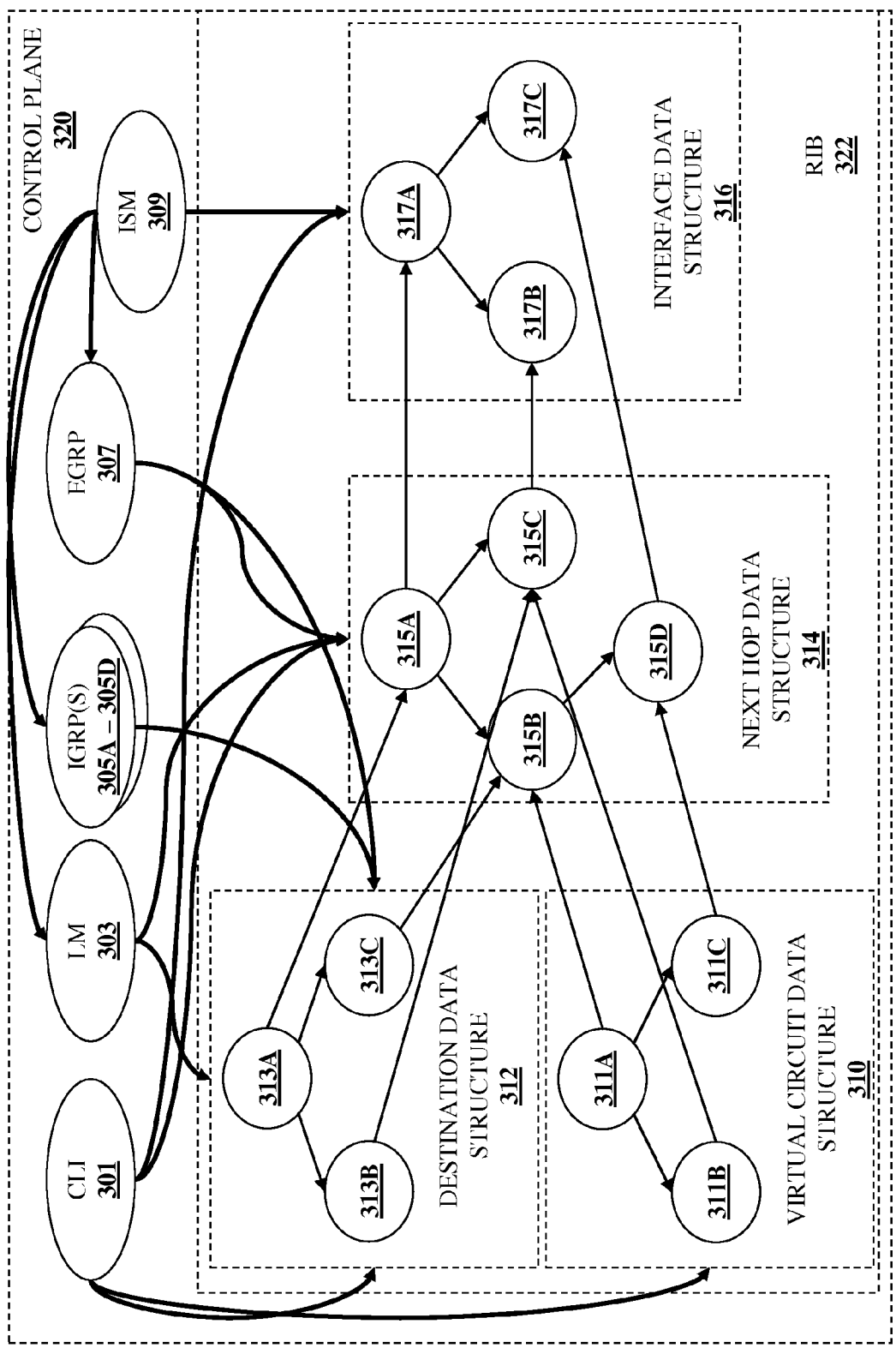
FIG. 3 is conceptual diagram illustrating a routing information base (RIB) in a control plane with a virtual circuit route according to one embodiment of the invention.

FIG. 3 is conceptual diagram illustrating a routing information base (RIB) in a control plane with a virtual circuit route according to one embodiment of the invention. In FIG. 3, a control plane 320 includes a command line interface 301, a label manager (LM) 303, one or more interior gateway routing protocol (IGRP) module(s) 305A-305D, an exterior gateway routing protocol (EGRP) module 307, and an interface state manager (ISM) (309). The control plane also includes a routing information base (RIB) 322.

The RIB 322 includes a destination data structure 312, a virtual circuit data structure 310, a next hop data structure 314, and an interface data structure 316.

The destination data structure 312 includes destination elements 313A-313C. Each of the destination elements 313A-313C indicate a layer 3 destination (e.g., an IP prefix). Each of the destination elements 313A-313C point to a next hop element of the next hop data structure 314. The next hop data structure 314 includes next hop elements 315A-315D. Each of the next hop elements 315A-315D point to an element in the interface data structure 316. The interface data structure 316 includes interface elements 317A-317C. The virtual circuit data structure 310 includes virtual circuit elements 311A-311C. Each of the virtual circuit elements 311A-311C points to a next hop element in the next hop data structure 314. Each of the data structures in the RIB 322 are populated and maintained by one or more of the modules in the control plane 320. In addition, the relationships between the data structures in the RIB 322 are created and maintained by the modules in the control plane 320.

The CLI 301 receives configurations from an administrator and performs these configurations on the RIB 322. FIG. 3 illustrates the CLI 301 performing operations on each of the data structures within the RIB 322. The administrator can enter configuration information which adds, deletes, and/or modifies an element in any one of the data structures within the RIB 322. The label manager 303 is illustrated in FIG. 3 as performing operations on the destination data structure 312 and the next hop data structure 314. The label manager 303 inserts, removes, and/or modifies an element in the next hop data structure 314 that indicates a label for a label switched path (LSP) for a corresponding destination indicated in the destination data structure 312. The IGRP module(s) 305A-305D (e.g., RIP, IS-IS, iBGP, OSPF, etc.) perform operations on the destination data structure 312, the next hop data structure 314, and the interface data structure 316. The IGRP module(s) 305A-305D learn layer 3 routing information from peers and reflect the learned routing information in the destination data structure 312, the next hop data structure 314, and the interface data structure 316. The EGRP module 307 (e.g., eBGP) performs operations on the destination data structure 312, next hop data structure 314, and the interface data structure 316. The EGRP module 307 modifies the RIB 322 with routing information learned from its EGRP peers. The ISM 309 maintains information for the interfaces of the network element. The ISM 309 propagates this information to the LM 303, the IGRP module(s) 305A-305D, and the EGRP module 307. The ISM 309 also updates state information for interfaces identified in the interface data structure 316. The control plane 320 may include additional modules that are not illustrated (e.g., tunneling modules, VPN modules, etc.).

Figure 4:
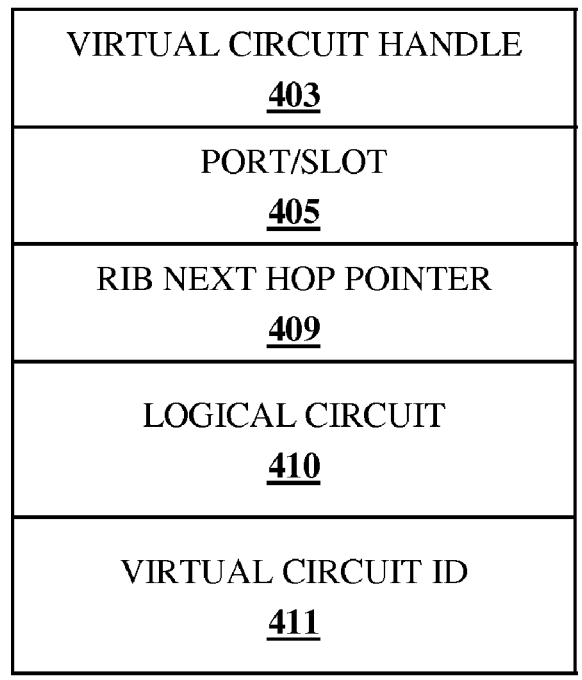
FIG. 4 is a conceptual diagram illustrating a virtual circuit element of a virtual circuit data structure in a control plane according to one embodiment of the invention.

FIG. 4 is a conceptual diagram illustrating a virtual circuit element of a virtual circuit data structure in a control plane according to one embodiment of the invention. A virtual circuit element 401 in a control plane includes: a virtual circuit handle field 403, port/slot field 405, a RIB next hop pointer field 409, a virtual circuit ID field 411, and a logical circuit field 410. The virtual circuit handle 403 identifies the handle defined by an administrator to identify the virtual circuit. The port/slot field 405 identifies the physical attributes of the virtual circuit (e.g., port, slot, etc.). The RIB next hop pointer 409 references a next hop element in a next hop data structure of the RIB. The virtual circuit field ID 411 indicates a virtual circuit ID generated by the host network element. The host network element generates the virtual circuit ID as an alternative identifier for the virtual circuit handle. In one embodiment of the invention, the virtual circuit ID is used by processes to identify the particular virtual circuit while the virtual circuit handle is used as a user friendly identifier to identify virtual circuits. The logical circuit field 410 identifies the logical circuit (e.g., an ATM circuit, a frame relay circuit, etc.) that is associated with a virtual circuit identified by the control plane RIB virtual circuit element 401.

Figure 5:
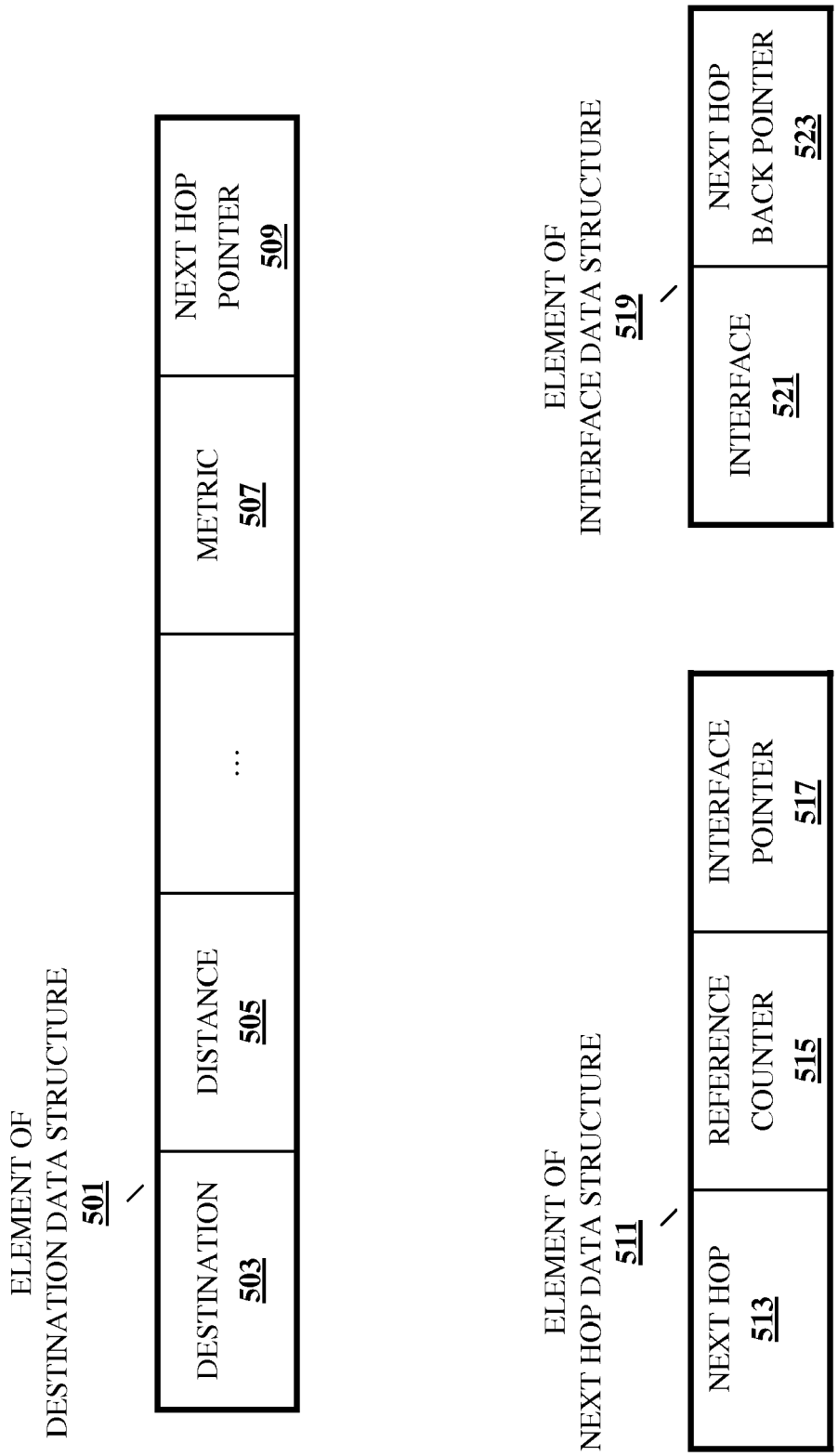
FIG. 5 is a block diagram illustrating individual elements of data structures of a routing information base (RIB) according to one embodiment of the invention.

FIG. 5 is a block diagram illustrating individual elements of data structures of a routing information base (RIB) according to one embodiment of the invention. An element of a destination data structure 501 ("destination element") includes a destination field 503. The destination field 503 indicates a network address (e.g., a network prefix, an IP address, etc.). The destination element 501 can also include additional fields to describe a route, such as a distance field 505 and a metric field 507. The distance field 505 indicates a distance from the local network element (i.e., the network element hosting the RIB) to the destination indicated in the destination field 503. The metric field 507 indicates a metric that can vary with the routing protocol (e.g., a maximum hop). The destination element 501 also includes a next hop pointer field 509. The next hop pointer field 509 references an element in a next hop data structure of the RIB.

FIG. 5 also illustrates an element of a next hop data structure 511 ("next hop element"). The next hop element 511 includes three fields: a next hop field 513, a reference counter field 515, and an interface pointer field 517. The next hop field 513 indicates an address for the next hop in relation to the hosting network element. The reference counter field 515 indicates the number of destination elements that reference the next hop element. The interface pointer field 517 references an element of an interface data structure. The interface pointer field 517 may alternatively reference another element that is not the primary next hop. In another embodiment of the invention, the next hop element 511 includes a next hop pointer field that references one or more next hops which are secondary or alternate next hops.

An element of an interface data structure 519 ("interface element") includes two fields: an interface field 521 and a next hop back-pointer field 523. The interface field 521 indicates an interface of the hosting network element. The interface could be a logical interface or a physical interface. The next hop back-pointer field 523 is an optional field that references the next hop element that references the interface element 519.

Figure 6:
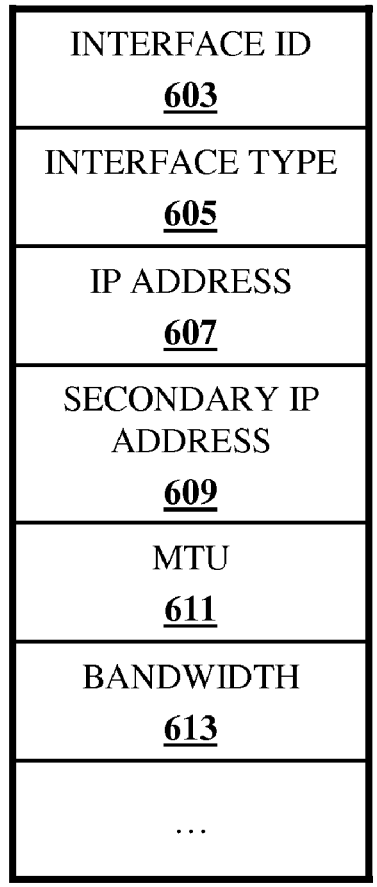
FIG. 6 is a diagram illustrating an exemplary data structure for an interface according to one embodiment of the invention.

FIG. 6 is a diagram illustrating an exemplary data structure for an interface according to one embodiment of the invention. A control plane interface structure 601 includes multiple fields describing the interface. An interface ID field 603 indicates a value identifying the interface. An interface type field 605 describes the type of interface (e.g., Ethernet, ATM, PoS, etc.). An IP address field 607 identifies a 32-bit IP address corresponding to the interface. A secondary IP address field 609 indicates a second 32-bit IP address for the interface. A maximum transmission unit (MTU) field 611 indicates the maximum allowable packet size to be transmitted with the interface. A bandwidth field 613 indicates the amount of bandwidth allocated to the interface. The control plane interface structure 601 may include additional fields or fewer fields.

Figure 7:
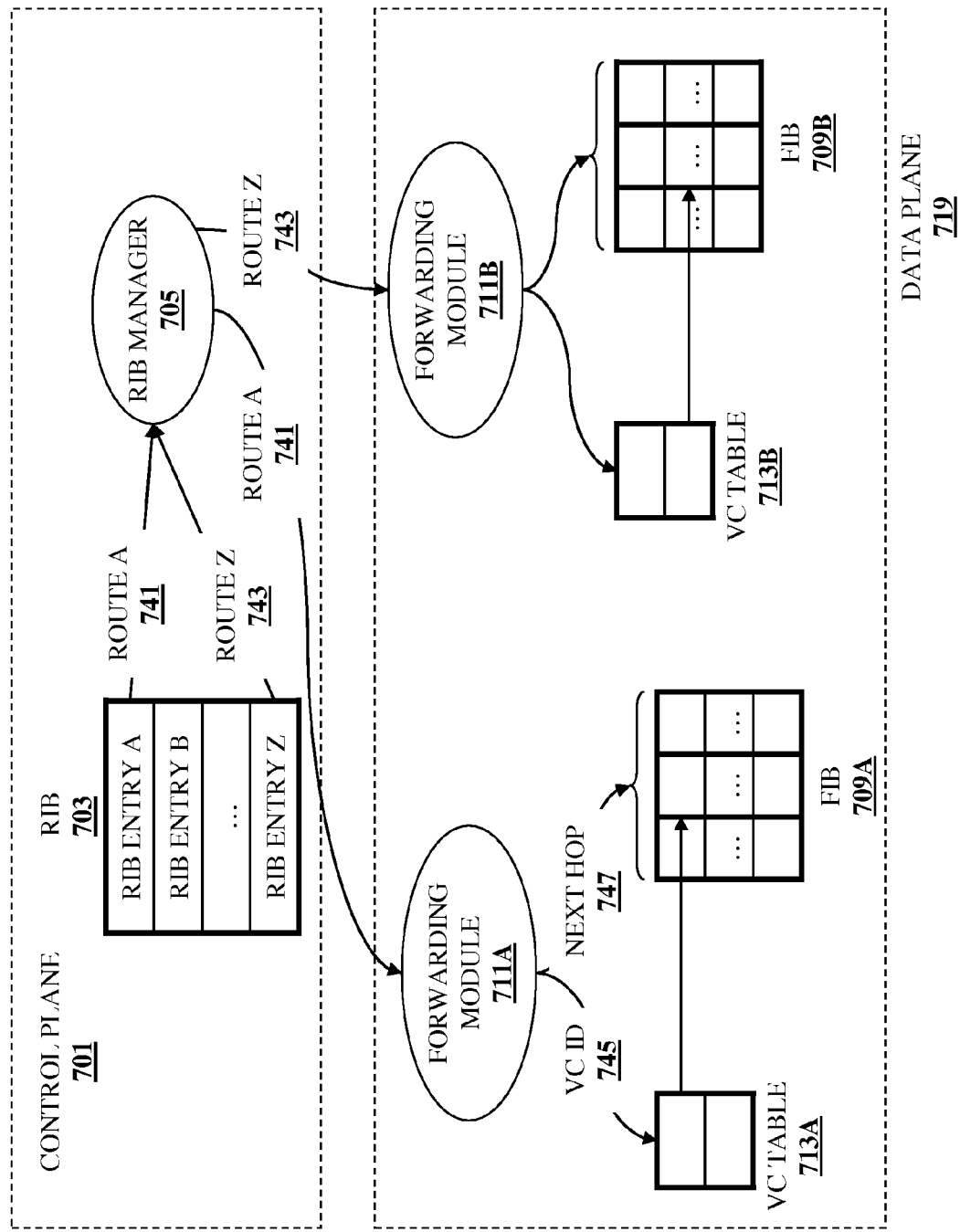
FIG. 7 is a conceptual diagram illustrating distribution of routes from a control plane to a data plane according to one embodiment of the invention.

It should be understood that the data structures described in FIGS. 6-7 are exemplary and meant to aid in understanding the invention, not meant to be limiting upon the invention.

FIG. 7 is a conceptual diagram illustrating distribution of routes from a control plane to a data plane according to one embodiment of the invention. A control plane 701 includes a RIB 703 and a RIB manager 705. The RIB 703 includes RIB entries A-Z. A trigger (e.g., a user defined trigger, addition of an entry, modification of an entry, etc. to the RIB 703) causes a route A 741 and a route Z 743 to be distributed by the RIB manager 705 to a data plane 719. The data plane 719 includes forwarding module(s) 711A and 711B, forwarding information bases (FIBs) 709A and 709B, and virtual circuit (VC) tables 713A and 713B. In this illustration, it is assumed that route A 741 and route Z 743 are virtual circuit routes, but does not exclude a destination from being sent with the virtual circuit and next hop. The forwarding module 711A receives route A 741 and adds a virtual circuit ID 745 from the route A 741 into the VC table 713A. The forwarding module 711A also adds a next hop 747 from the route A 741 to the FIB 709A. The forwarding module 711B does similar operations with the route Z 743. Although not illustrated, the RIB manager 705 also distributes layer 3 routes to the data plane which are processed by forwarding modules in the data plane 719. Also, the RIB manager 705 may download a VC route to the data plane 719 for which a layer 3 route has already been downloaded (i.e., the next hop is already in a FIB of the data plane). Various mechanisms can be implemented to optimize the transfer of data from the central plane 701 to the data plane 719. For example, the RIB manager may communicate a VC ID and a next hop with a flag that indicates to the receiving forwarding module whether to add the next hop to its FIB, to add the VC ID to its VC table and reference the next hop from the new VC ID, as to reference the next hop already in its FIB from a VC ID already in its VC table. In addition, the control plane 701 may transmit data to the data plane 719 in accordance with a proprietary protocol, a messaging scheme, as packets, etc.

Figure 8:
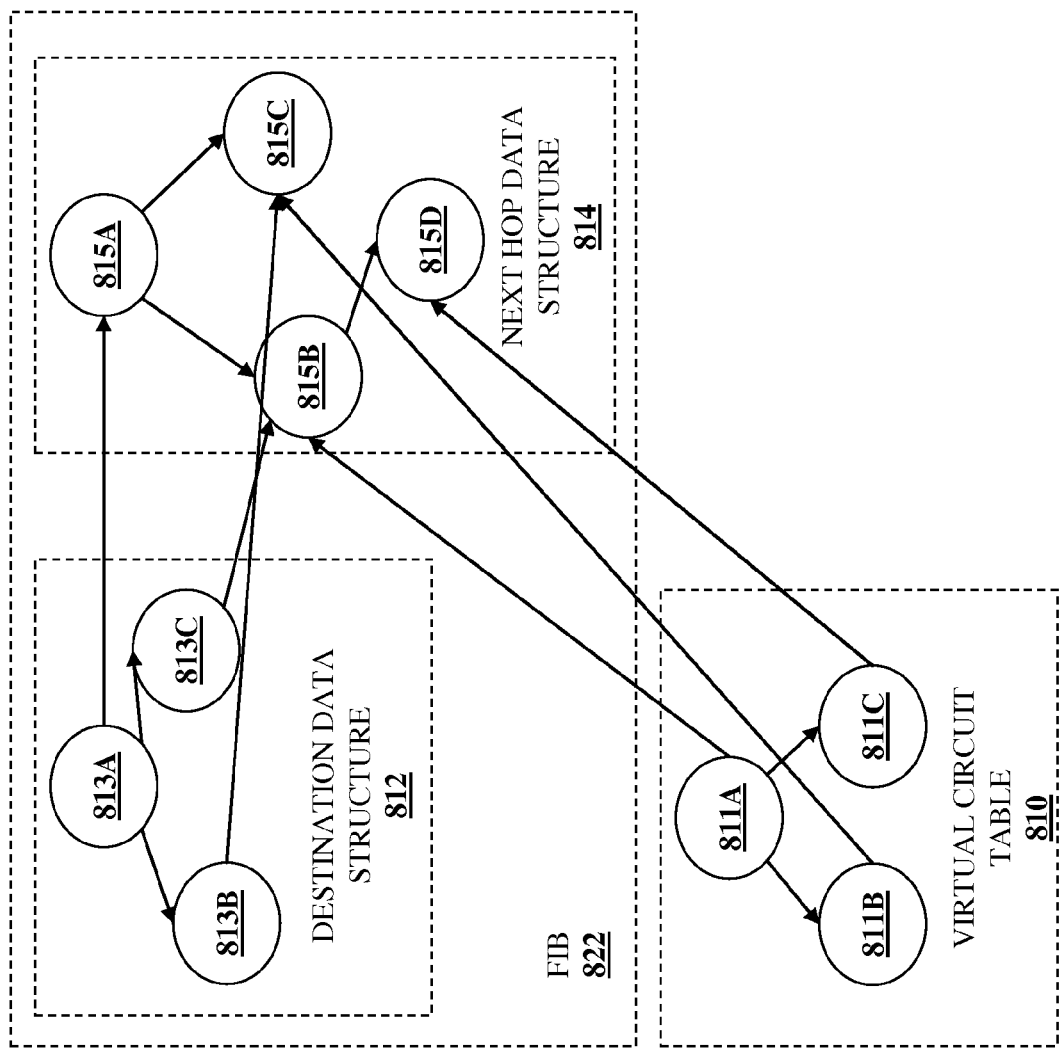
FIG. 8 is a conceptual diagram illustrating the relationship between a virtual circuit table and a FIB according to one embodiment of the invention.

FIG. 8 is a conceptual diagram illustrating the relationship between a virtual circuit table and a FIB according to one embodiment of the invention. In FIG. 8, a destination data structure 812 includes destination elements 813A-813C. A next hop data structure 814 includes next hop elements 815A-815D. The destination element 813A references the next hop element 815A. The destination element 813B references the next hop element 815C. The destination element 813C references the next hop element 815B. Although the virtual circuit table 810 is illustrated as being separate from a FIB 822 and the FIB 822 includes the destination data structure 812 and the next hop data structure 814, alternative embodiments may implement the FIB 822 to include the virtual circuit table 810. Virtual circuit table 810 includes virtual circuit elements 811A-811C. The reference relationships between elements of the virtual circuit table 810 and the next hop data structure 814 are as follows: 811A→815B, 811B→815C, and 811C→815D.

FIG. 9 is an exemplary diagram illustrating an element of a virtual circuit table according to one embodiment of the invention. A virtual circuit table element 901 includes numerous fields for processing packets associated with the virtual circuit (either egress or ingress) corresponding to the virtual circuit table element 901. A virtual circuit ID field 903 identifies a virtual circuit. In alternative embodiments of the invention, the virtual circuit ID field 903 indicates a pointer value for the virtual circuit table element 901. A pointer to interface field 905 includes a pointer to an interface structure. The pointer to interface field 905 implicitly indicates whether the represented virtual circuit is bound to an interface. If the represented virtual circuit is bound to an interface, then the pointer to interface field 905 provides access to certain interface data, such as interface name and/or a virtual router. In addition, the pointer to interface field 905 provides access to features associated with the interface.

A pointer to port field 909 indicates a port through which traffic will be transmitted for an egress virtual circuit. A flow counter field 911 indicates byte counters and packet counters for traffic associated with the represented virtual circuit. A pointer to root modular functional block field 913 points to the first modular functional block of a possible chain of modular functional blocks corresponding to the virtual circuit represented by the virtual circuit table element 901. A pointer to FIB field 915 points to a forwarding information base. A pointer to an ACL field 917 points to an access control list corresponding to the virtual circuit represented by the virtual circuit table element 901. A pointer to an LFIB field 919 points to a label forwarding information base if applicable. An error counter field 921 indicates counters such as unreachable counters, virtual circuit down counters, and unknown encapsulation counters. A reference counter field 923 indicates the number of other applications and/or processes that reference the virtual circuit table element 901. The reference counter field 923 can be used to avoid releasing the virtual circuit table element 901 while it is still being used.

An encapsulation type field 925 identifies the encapsulation type defined for the virtual circuit represented by the virtual circuit table element 901. A transmit counter field 927 indicates a counter for the number of packets transmitted from the represented virtual circuit. A timers field 929 indicates timers defined for the represented virtual circuit. The timers field 929 includes a delete timer and a free timer. The represented virtual circuit may be created from an explicit configuration command or as a side-effect of another operation (e.g., configuring a tunnel).

If the virtual circuit represented by the virtual circuit table element 901 is created as a side-effect of an operation, then a configuration command for the virtual circuit is expected. If the configuration command is not received before the delete timer expires, then the virtual circuit table element 901 is deleted.

If a configuration command is received to delete the virtual circuit table element 901, then the virtual circuit table element 901 is marked as deleted, but the memory is not freed until the free timer expires. In alternative embodiments of the invention, a separate timer field is defined for each timer.

A next hop pointer field 931 references a layer 3 next hop element of a FIB. The link between the represented virtual circuit and the layer 3 next hop creates a virtual circuit route.

Various embodiments of the invention may implement the virtual circuit table element 901 differently. For example, the pointer to interface field and the pointer to port field may not be included in a virtual circuit structure in alternative embodiments of the invention. Other various fields may not be included in the virtual circuit table element while other fields are added.

Figure 10:
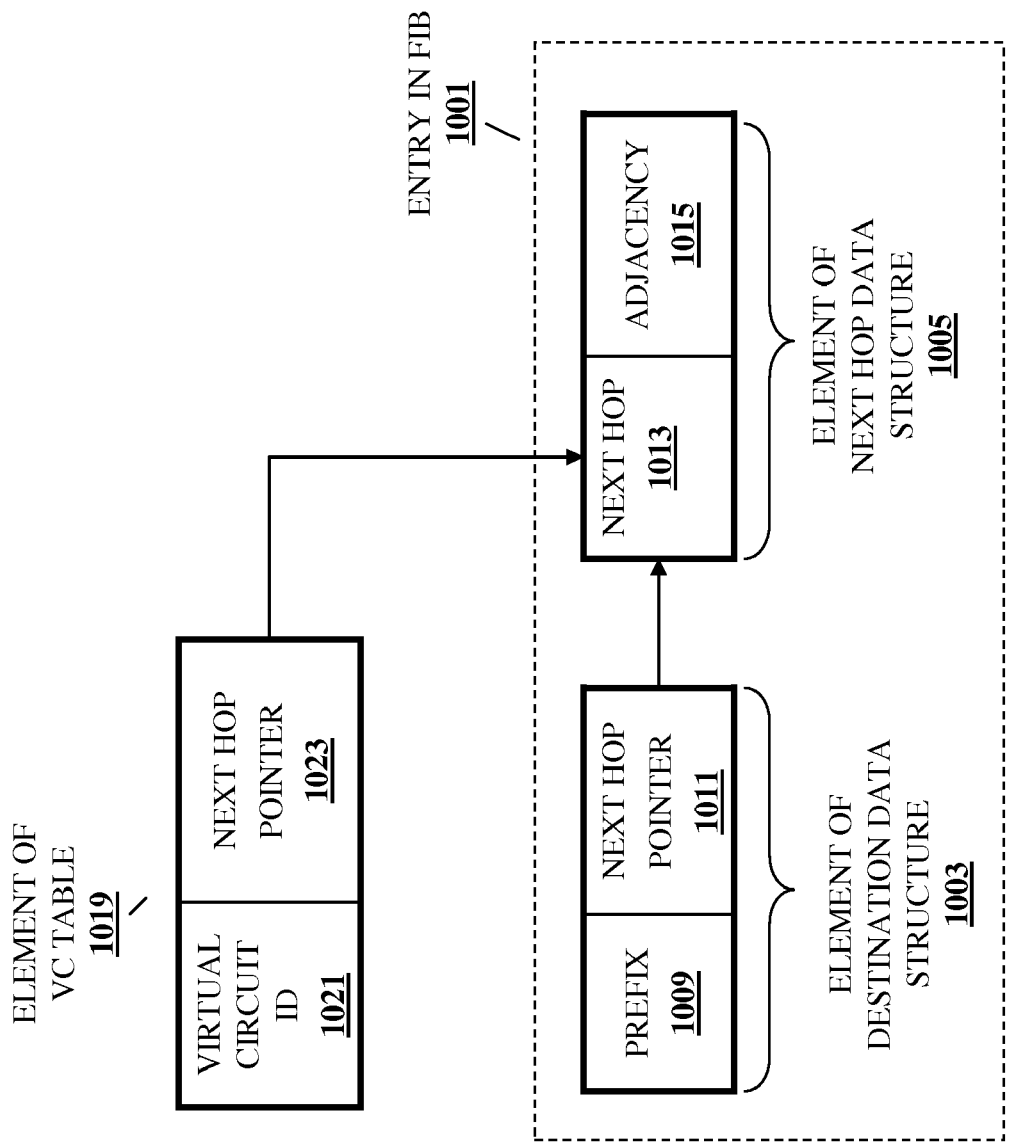
FIG. 10 is a conceptual diagram illustrating the relationship between an element of a virtual circuit and an entry in a FIB according to one embodiment of the invention.

FIG. 10 is a conceptual diagram illustrating the relationship between an element of a virtual circuit and an entry in a FIB according to one embodiment of the invention. In FIG. 10, an entry in a FIB 1001 includes an element of a destination data structure 1003 and an element of a next hop data structure 1005. The destination element 1003 includes a prefix field 1009 and a next hop pointer field 1011. The next hop pointer field 1011 references the next hop element 1005. The next hop element 1005 includes a next hop field 1013 and an adjacency 1015. The adjacency 1015 identifies information for forwarding a packet through a network element. An element of VC table 1019 includes a virtual circuit ID field 1021 and a next hop pointer field 1023. The next hop pointer field 1023 of the virtual circuit table element 1019 references the next hop element 1005.

Figure 11:
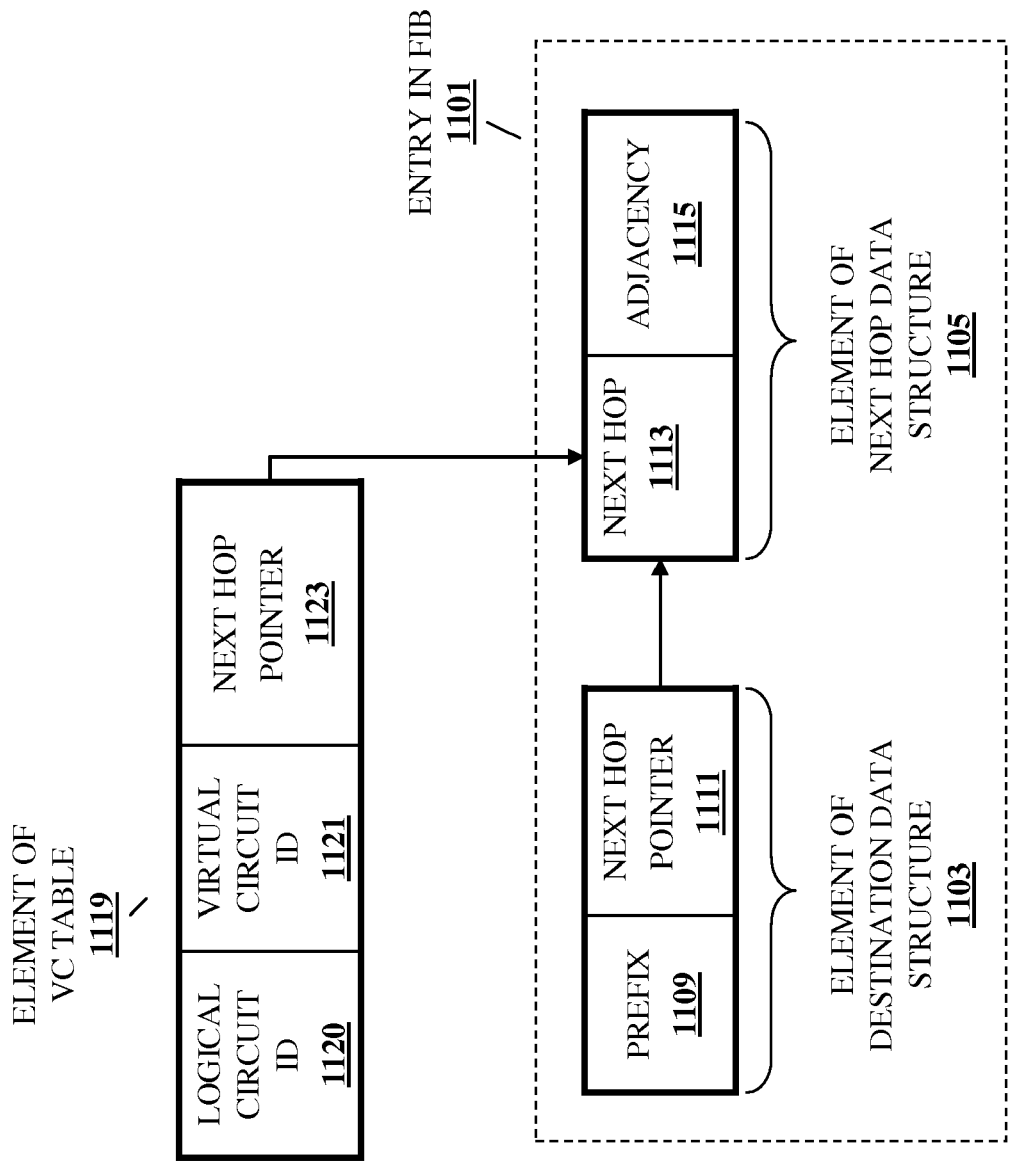
FIG. 11 is a conceptual diagram illustrating an alternative virtual circuit element and its relationship to an entry in FIB according to one embodiment of the invention.

FIG. 11 is a conceptual diagram illustrating an alternative virtual circuit element and its relationship to an entry in FIB according to one embodiment of the invention. In FIG. 11, an entry in a FIB 1101 includes an element of a destination data structure 1103 and an element of a next hop data structure 1105 similar to FIG. 10. The destination element 1103 includes a prefix field 1109 and a next hop pointer field 1111. The next hop pointer field 1111 references the next hop element 1105. The next hop element 1105 includes a next hop field 1113 and an adjacency 1115. The adjacency 1115 identifies information for forwarding a packet through a network element. An element of VC table 1119 includes a virtual circuit ID field 1121 and a next hop pointer field 1123. The next hop pointer field 1123 of the virtual circuit table element 1019 references the next hop element 1105. In addition to the virtual circuit ID field 1121 and the next hop pointer field 1123, the virtual circuit table element 1119 includes a logical circuit ID field 1120. The logical circuit ID field 1120 indicates a logical circuit associated with the represented virtual circuit.

Figure 12:
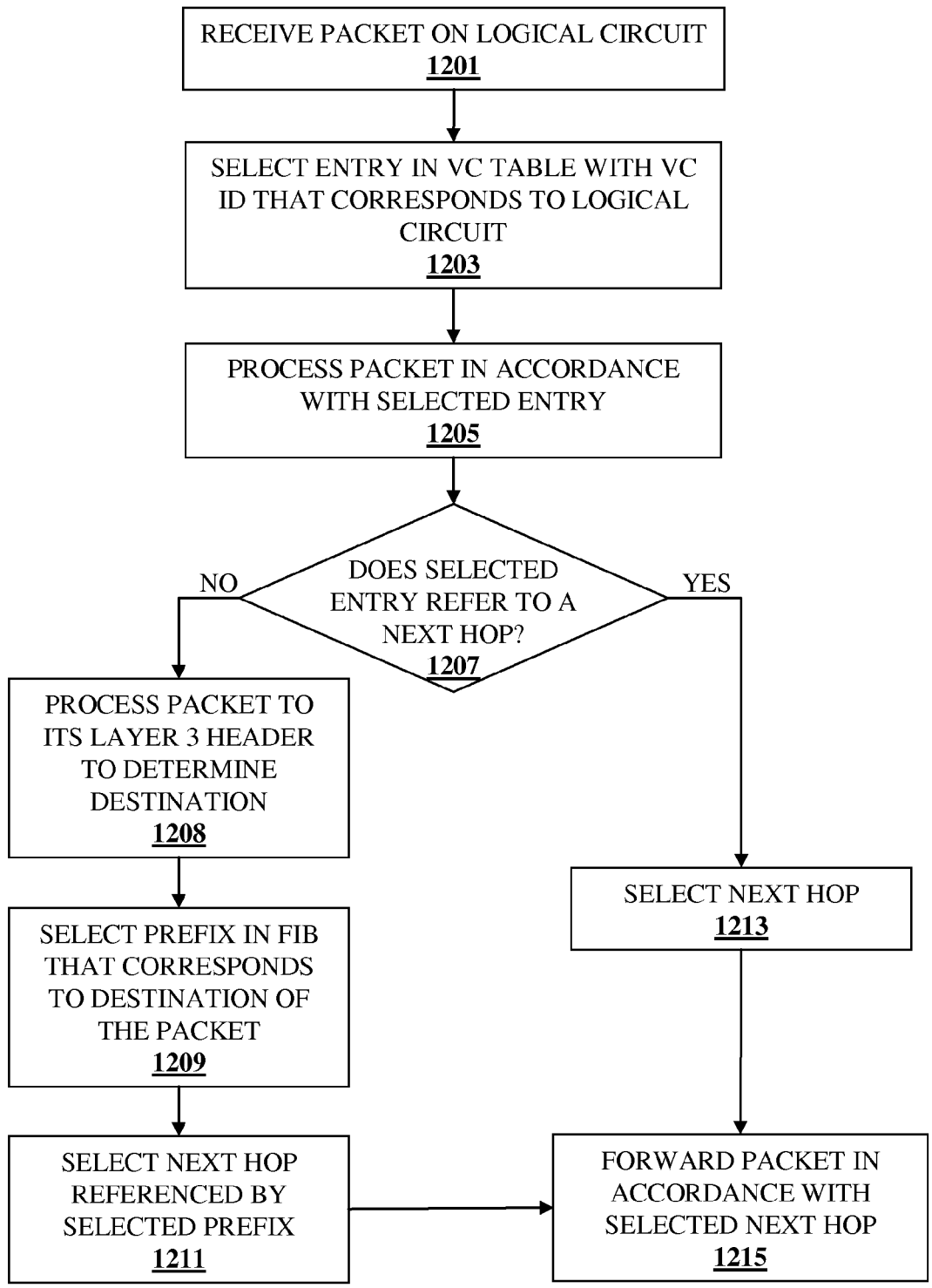
FIG. 12 is an exemplary flow chart for forwarding a packet along a virtual circuit route according to one embodiment of the invention.

FIG. 12 is an exemplary flow chart for forwarding a packet along a virtual circuit route according to one embodiment of the invention. At block 1201, a packet is received on a logical circuit. At block 1203, an entry in a virtual circuit table with a virtual circuit ID that corresponds to the logical circuit is selected. At block 1205, the received packet is processed in accordance with the selected entry. At block 1207, it is determined if the selected entry refers to a next hop. If the selected entry does not refer to a next hop, then control flows to block 1208. If the selected entry refers to a next hop, then control flows to block 1213.

At block 1213, the referenced next hop is selected. At block 1215, the packet is forwarded in accordance with the selected next hop.

At block 1208, the packet is processed to its layer 3 header to determine a destination. At block 1209, a prefix in a FIB that corresponds to the destination of the packet is selected. At block 1211, the next hop referenced by the selected prefix is selected. From block 1211 control flows to block 1215.

Virtual circuit routes enable forwarding of packets to layer 3 destination efficiently. A packet's layer 3 next hop can be determined without processing beyond layer 2. In addition, virtual circuit routes can be tied to tunnels, virtual private networks (VPNs), etc.

While the flow diagram shows a particular order of operations performed by certain embodiments of the invention, it should be understood that such order is exemplary (e.g., alternative embodiments may perform the operations in a different order, combine certain operations, overlap certain operations, etc.).

Figure 13:
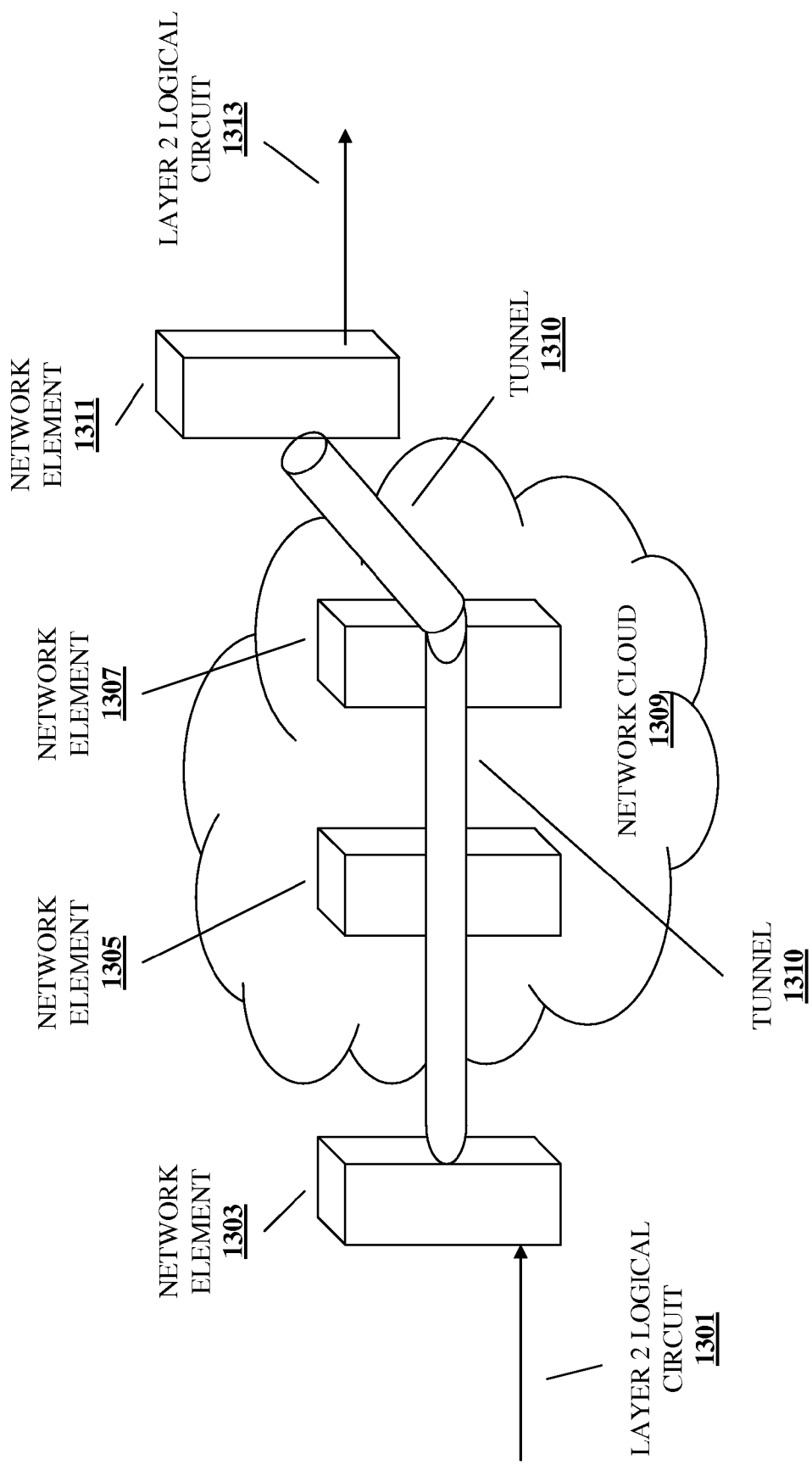
FIG. 13 is a conceptual diagram of an application of a virtual circuit route according to one embodiment of the invention.

FIG. 13 is a conceptual diagram of an application of a virtual circuit route according to one embodiment of the invention. In FIG. 13, a layer 2 logical circuit 1301 carries traffic into a network element 1303. From the network element 1303 packets traverse network cloud 1309 through network elements 1305 and 1307 via a tunnel 1310. A network element 1311 terminates the tunnel 1310 and forwards traffic onto a layer 2 logical circuit 1313. Utilizing virtual circuit routes in the network element 1303 enables the network element 1303 to forward traffic received on the layer 2 logical circuit 1301 directly to the tunnel 1310 without higher layer processing which is typically required.

Figure 14:
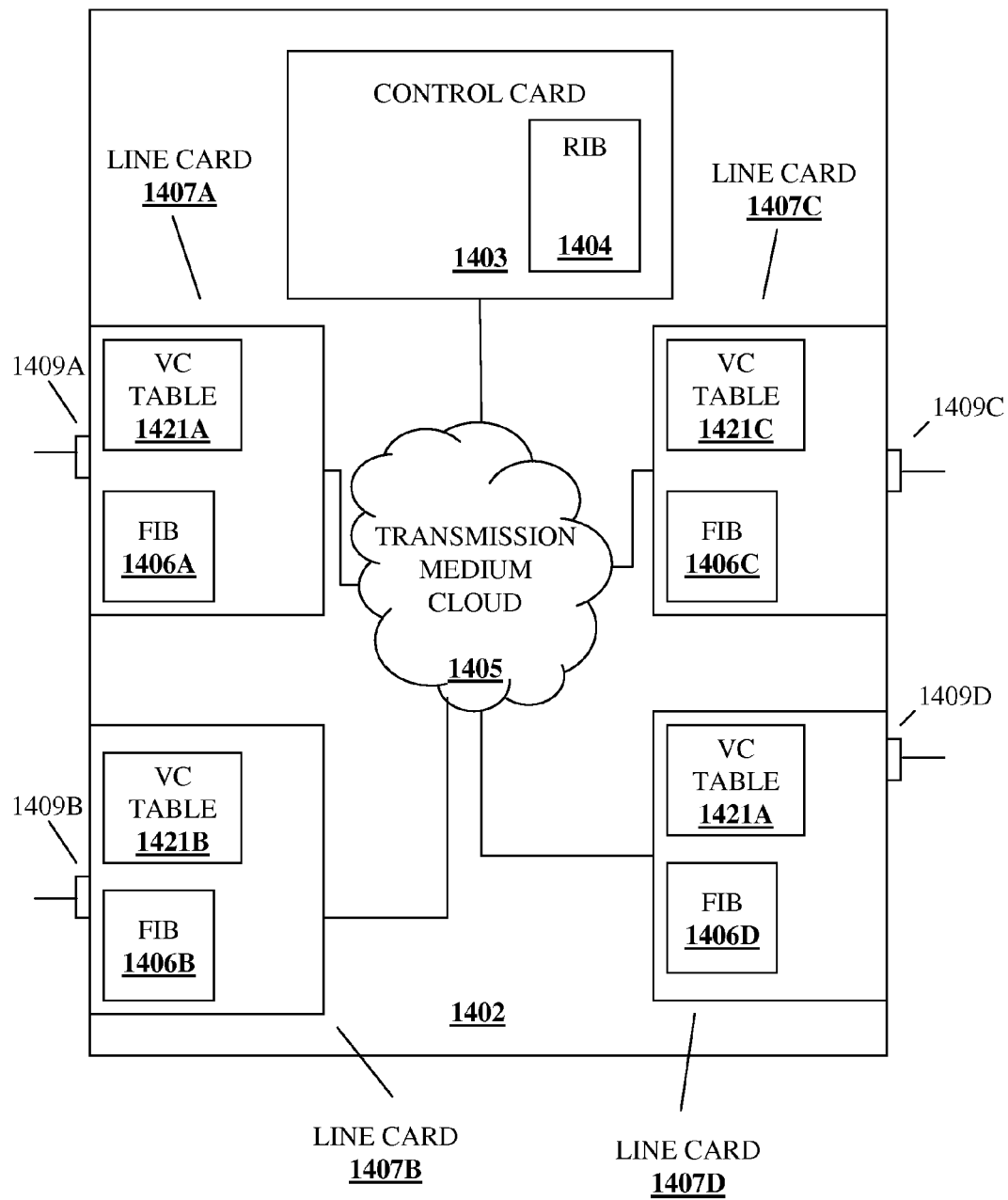
FIG. 14 is an exemplary diagram of a network element according to one embodiment of the invention.

FIG. 14 is an exemplary diagram of a network element according to one embodiment of the invention. In FIG. 14, a RIB 1404 is shown as being hosted on a control card 1403 of a network element 1402. In various embodiments of the invention, the RIB 1404 can be hosted on a co-processor, an ASIC, etc. The control card 1403 is coupled with a transmission medium cloud 1405 (e.g., a system bus). The transmission medium cloud 1405 is coupled with line cards 1407A-1407D. The line cards 1407A-1407D host FIBs 1406A-1406D, respectively. The line cards 1407A-1407D also host VC tables 1421A-1421D, respectively. The line cards 1407A-1407D are coupled to physical interfaces 1409A-1409D, respectively. The FIBs 1406A-1406D and VC tables 1421A-1421D are updated in accordance with updates and/or modifications made to the RIB 1404.

The control card 1403 and line cards 1407A-1407D illustrated in FIG. 14 includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A network element comprising:
a control card having a virtual circuit data structure and a next hop data structure, wherein the virtual circuit data structure includes a virtual circuit element that represents a layer 2 virtual circuit and indicates a layer 2 protocol specific logical circuit associated with the layer 2 virtual circuit and the virtual circuit element references a first next hop element of the next hop data structure, wherein the first next hop element indicates a layer 3 next hop, and wherein the control card is configured to distribute the virtual circuit element and the first next hop element to a line card that is coupled with the control card; and
the line card having a forwarding information base (FIB) and a virtual circuit table, wherein the line card is configured to create in the virtual circuit table a virtual circuit table element based on the distributed virtual circuit element, wherein the line card is configured to create in the FIB a second next hop element based on the first next hop element indicates the layer 3 next hop, and wherein the virtual circuit table element references the layer 3 next hop in the second next hop element that is associated with a represented layer 2 virtual circuit indicated by the virtual circuit table element.

2. The network element of claim 1, wherein the virtual circuit element and the virtual circuit table element also reference a logical circuit ID and a virtual circuit ID.

3. The network element of claim 1, wherein a packet is forwarded to a set of one or more alternate layer 3 next hops if the layer 3 next hop is unavailable.

4. The network element of claim 1, wherein the virtual circuit element includes a delete timer and a free timer.

5. The network element of claim 4, wherein the delete timer operates to delete the virtual circuit element if a configuration command is not received before a time limit within the delete timer expires.

6. The network element of claim 4, wherein the free timer operates to delete the virtual circuit element if a delete command is received and a time limit within the free timer expires.

7. A network comprising:
a first network element for transmitting a packet, wherein the packet includes a layer 2 header and a layer 3 header;
a second network element for,
associating a layer 2 virtual circuit to a layer 3 next hop,
receiving the packet,
processing the layer 2 header,
determining a layer 2 protocol specific logical circuit from the layer 2 header, wherein the layer 2 virtual circuit is associated with the layer 2 protocol specific logical circuit, selecting the layer 2 virtual circuit that is associated with the layer 2 protocol specific logical circuit from a virtual circuit table, and without processing the layer 3 header:
determining the layer 3 next hop that is associated with the layer 2 virtual circuit in the virtual circuit table, and forwarding the packet to the layer 3 next hop indicated by the layer 2 virtual circuit without processing the layer 3 header; and a third network element for receiving the packet from the second network element.

8. The network element of claim 7, wherein the virtual circuit table includes a logical circuit ID field, a virtual circuit ID field, and a next hop pointer field.

9. The network element of claim 7, wherein the layer 2 virtual circuit also indicates a set of one or more alternate layer 3 next hops if the layer 3 next hop is unavailable.

10. The network element of claim 7, wherein the layer 2 virtual circuit also includes a delete timer and a free timer.

11. The network element of claim 10, wherein the delete timer operates to delete the layer 2 virtual circuit if a configuration command is not received before a time limit within the delete timer expires.

12. The network element of claim 10, wherein the free timer operates to delete the layer 2 virtual circuit if a delete command is received and a time limit within the free timer expires.

13. A set of one or more non-transitory tangible machine-readable medium that provides instructions, which when executed by a set of one or more processors, cause said set of processors to perform operations comprising:
associating a virtual circuit to a layer 3 next hop, the virtual circuit being associated with a layer 2 protocol specific logical circuit;
receiving a packet on the layer 2 protocol specific logical circuit;
processing the packet with configuration information indicated by the virtual circuit; and
without processing the layer 3 header:
determining the layer 3 next hop that is associated with the virtual circuit in a virtual circuit table, and
forwarding the packet to the layer 3 next hop.

14. The non-transitory tangible machine-readable medium of claim 13, wherein said associating includes defining the virtual circuit within a VC (virtual circuit) table having a logical circuit ID field, a virtual circuit ID field, and a next hop pointer field.

15. The non-transitory tangible machine-readable medium of claim 14, further comprising processing a second packet according to the second packet's layer 3 header if a second virtual circuit is not defined within the VC table that associates a second layer 2 protocol specific logical circuit with the second packet and a second layer 3 next hop.

16. The non-transitory tangible machine-readable medium of claim 13, wherein the forwarding includes forwarding the packet to a set of one or more alternate layer 3 next hops if the layer 3 next hop is unavailable.

17. The non-transitory tangible machine-readable medium of claim 13, further comprising operating a delete timer and a free timer for the virtual circuit.

18. The non-transitory tangible machine-readable medium of claim 17, wherein said operating includes operating the delete timer to delete the virtual circuit if a configuration command is not received before a time limit within the delete timer expires.

19. The non-transitory tangible machine-readable medium of claim 17, wherein said operating includes operating the free timer to delete the virtual circuit if a delete command is received and a time limit within the free timer expires.

20. A network element, comprising:
    a line card configured to store a virtual circuit element that indicates a layer 2 virtual circuit that references a layer 3 next hop, wherein the line card is further configured to:
        receive a packet on a layer 2 protocol specific logical circuit that is associated with the layer 2 virtual circuit, wherein the packet includes a layer 2 header and a layer 3 header, and
        without processing the layer 3 header of the packet:
            determine the layer 3 next hop that is associated with the layer 2 virtual circuit, and
            forward the packet to the layer 3 next hop.

21. The network element of claim 20, wherein the line card is further configured to store layer 3 routes that each represents a layer 3 address and a corresponding layer 3 next hop, and wherein each line card is further configured to,
    responsive to receipt of a packet on a layer 2 protocol specific logical circuit that is associated with a layer 2 virtual circuit that does not reference a layer 3 next hop, determine a layer 3 next hop for that packet through an examination of that packet's layer 3 header and forward that packet toward its determined layer 3 next hop.

22. The network element of claim 20, wherein the virtual circuit element and its referenced layer 3 next hop are tied to one of a tunnel and a virtual private network (VPN).

\* \* \* \* \*